United States Patent
Bosson et al.

(10) Patent No.: US 10,929,262 B2
(45) Date of Patent: Feb. 23, 2021

(54) PROGRAMMABLE ELECTRONIC COMPUTER IN AN AVIONICS ENVIRONMENT FOR IMPLEMENTING AT LEAST ONE CRITICAL FUNCTION AND ASSOCIATED ELECTRONIC DEVICE, METHOD AND COMPUTER PROGRAM

(71) Applicant: THALES, Courbevoie (FR)

(72) Inventors: Joël Bosson, Merignac (FR); Frederick Clement, Merignac (FR); Patrick Cadotte, Merignac (FR); Marc Fumey, Merignac (FR); Jean-Christophe Reculeau, Merignac (FR)

(73) Assignee: Thales, Courbevoie (FR)

( * ) Notice: Subject to any disclaimer, the term of this patent is extended or adjusted under 35 U.S.C. 154(b) by 202 days.

(21) Appl. No.: 16/226,188

(22) Filed: Dec. 19, 2018

(65) Prior Publication Data
US 2019/0196927 A1    Jun. 27, 2019

(30) Foreign Application Priority Data
Dec. 26, 2017   (FR) ...................... 17 01366

(51) Int. Cl.
| G06F 11/30 | (2006.01) |
| G05B 9/02 | (2006.01) |
| G05B 23/02 | (2006.01) |
| G06F 11/07 | (2006.01) |
| G06F 11/16 | (2006.01) |

(52) U.S. Cl.
CPC ............ *G06F 11/3013* (2013.01); *G05B 9/02* (2013.01); *G05B 23/0208* (2013.01); *G06F 11/0739* (2013.01); *G06F 11/0796* (2013.01); *G06F 11/1608* (2013.01); *G06F 11/1633* (2013.01); *G06F 11/1637* (2013.01)

(58) Field of Classification Search
CPC ............ G06F 11/3013; G06F 11/0739; G06F 11/0796; G06F 11/1608; G06F 11/1633; G06F 11/1637; G05B 9/02; G05B 23/0208
USPC ............................................. 701/3
See application file for complete search history.

(56) References Cited

U.S. PATENT DOCUMENTS

| 5,550,736 A | 8/1996 | Hay et al. | |
| 2013/0232343 A1* | 9/2013 | Horning | G06F 21/14 713/190 |

FOREIGN PATENT DOCUMENTS

| EP | 1014237 A1 | 6/2016 |
| EP | 3035135 A1 | 6/2016 |

OTHER PUBLICATIONS

Preliminary Search Report dated Oct. 8, 2018, received in FR 1701366 filed Dec. 26, 2017.

* cited by examiner

*Primary Examiner* — Gertrude Arthur Jeanglaude
(74) *Attorney, Agent, or Firm* — Knobbe, Martens, Olson & Bear, LLP (57) ABSTRACT

A programmable electronic computer embedded in an avionics environment on board an aircraft for implementing at least one critical function and associated electronic device, method and computer program are disclosed. In one aspect, the electronic computer includes at least one control module configured to implement a respective critical function and configured to deliver at least one output data item associated with the critical function, and at least one monitoring module of a control module of another electronic computer. Each monitoring module configured to implement the same respective critical function as the one implemented by the monitored control module.

10 Claims, 5 Drawing Sheets

PROGRAMMABLE ELECTRONIC COMPUTER IN AN AVIONICS ENVIRONMENT FOR IMPLEMENTING AT LEAST ONE CRITICAL FUNCTION AND ASSOCIATED ELECTRONIC DEVICE, METHOD AND COMPUTER PROGRAM

CROSS-REFERENCE TO RELATED APPLICATIONS

This patent application claims the benefit under 35 U.S.C. § 119 of French Application No. FR 17 01366 filed on Dec. 26, 2017, which is hereby incorporated by reference in its entirety.

BACKGROUND

Technological Field

The described technology relates to an electronic computer configured to implement at least one critical function.

The described technology also relates to an electronic device comprising a plurality of such electronic computers.

The described technology also relates to a method for implementing at least one critical function, wherein the method is implemented by such an electronic computer.

The described technology also relates to a non-transitory computer-readable medium including a computer program comprising software instructions which, when executed by a computer, implement such a method.

The described technology relates to the safety of an installation or apparatus comprising at least one electronic system, wherein the apparatus is preferably a vehicle, such as an air vehicle, in particular an aircraft, a railway vehicle or a motor vehicle. Alternatively, the installation may be a chemical plant or a power plant.

In particular, the described technology relates to the implementation of critical functions, i.e. that are critical for the safety of the device or the installation. Examples of such critical functions are vehicle control commands, such as aircraft flight controls, a vehicle braking system, the emergency shutdown of a chemical plant or power plant.

By "electronic computer" is meant a computing entity comprising its own resources. The electronic computer may be arranged in a separate housing, or on a module installed in a rack, or on an electronic card among others in a housing.

By "critical function" is meant a function whose implementation must be monitored in order to ensure safe operation of the device or system. Such a critical function also generally requires a redundancy of implementation chains of the critical function and monitoring chains of the critical function, in order to ensure the detection of defects or errors and also the availability of the function.

By "implementation of a critical function" is meant the performance of one or more computations to generate at least one output data item associated with this critical function, from at least one input data item. Those skilled in the art will then understand that the nature and the number of output data items and the computations performed, characterize the critical function.

Description of the Related Technology

In the avionics field, a critical function is, for example, defined by the ARP-4754A (Aerospace Recommended Practice) standard.

An electronic system is known that comprises a control computer called "COM" (from COMmand) consisting of an electronic computer that is intended to provide at least one command, and a monitoring computer called "MON" (from MONitor) that consists of an electronic computer for monitoring the command to detect any inconsistency and thus ensure the integrity of the command. In the event of detection of an inconsistency during this monitoring, wherein the two electronic computers are removed from service without looking for the origin of the defect, in order to ensure the integrity of the system. This system is known as the COM/MON pair.

A system comprising at least one COM/MON pair has the ability to detect at least one anomaly on one of the electronic computers. The system is then referred to as FAIL SAFE.

In order to obtain a system having the capacity to be able to continue operating with a sufficient level of integrity (at least FAIL SAFE) after the detection of an anomaly on one of the electronic computers, it is necessary to have at least two COM/MON pairs in parallel. The system is then referred to as FAIL OPERATIONAL.

Such a system, therefore, requires a large number of computers to ensure a satisfactory level of integrity but which involve a large footprint and mass.

SUMMARY OF CERTAIN INVENTIVE ASPECTS

One object of some aspects of the described technology is to provide an electronic computer offering improved operational availability while requiring reduced footprint and mass.

For this purpose, one aspect of the described technology is an electronic computer configured to implement at least one critical function, wherein the electronic computer is able to deliver at least one output data item associated with each critical function, wherein the electronic computer comprises:

at least one control module, wherein each control module is configured to implement a respective critical function and deliver at least one output data item associated with the critical function;

at least one monitoring module of a control module of another electronic computer, wherein each monitoring module is configured to implement the same respective critical function as that implemented by the monitored control module;

each control module is configured to receive, from an associated monitoring module of another electronic computer, the result of the implementation of the corresponding critical function, and to inhibit the delivery of the at least one associated output data item in the event of detection of an inconsistency between the result of its implementation of the respective critical function and that received from the monitoring module of the other electronic computer;

each monitoring module is configured to receive, from an associated control module of another electronic computer, the result of implementation of the corresponding critical function, and to inhibit the delivery, by the control module, of at least one associated output data item in the event of detection of an inconsistency between the result of its implementation of the respective critical function and that received from the control module of the other electronic computer.

According to other advantageous aspects of the described technology, the electronic computer comprises one or more of the following characteristics, taken separately or in any technically feasible combination:

each module among the at least one control module and the at least one monitoring module, is installed in a respective partition, the electronic computer comprises its own power supply and its own computing unit, the critical function is an avionics function, the electronic computer complies with the ARINC-653 standard, and the electronic computer complies with the DO297 standard.

The described technology also relates to an electronic device comprising N electronic computers, wherein N is an integer greater than or equal to 2, and wherein each electronic computer is as defined above.

According to other advantageous aspects of the described technology, the electronic device comprises one or more of the following characteristics, taken separately or in any technically feasible combination:

for each electronic computer, the set of electronic computers comprising a control module monitored by a monitoring module of the electronic computer, and all the electronic computers comprising a monitoring module monitoring a control module of the electronic computer are separate, the number N of electronic computers is even, and for a given critical function, (N/2) electronic computers comprise (N/2−1) control modules and (N/2) monitoring modules, wherein (N/2) other electronic computers comprise (N/2−1) monitoring modules, the number N of electronic computers is odd, and for a given critical function, each electronic computer comprises (N−1)/2) control modules and ((N−1)/2) monitoring modules, each electronic computer comprises at most (N−1) modules per critical function, at least three control modules are associated with the same critical function.

The described technology also relates to a method for implementing a critical function, wherein the method is implemented by an electronic computer and comprises the following steps:

first implementation of at least one critical function and delivery of at least one output data item associated with the critical function;

second implementation of at least one critical function identical to that implemented by another electronic computer;

first reception, by another electronic computer, of the result of implementation of the critical function corresponding to the first implementation, and inhibition of the delivery of the at least one associated output data item in the event of the detection of an inconsistency between the result of the first implementation of the respective critical function and that received from the other electronic computer;

second reception, by another electronic computer, of the result of the implementation of the critical function corresponding to the second implementation, and inhibition of the delivery, by the other electronic computer, of the at least one associated output data item in the event of detection of an inconsistency between the result of the second implementation of the respective critical function and that received from the other electronic computer.

The described technology also relates to a non-transitory computer-readable medium including a computer program comprising software instructions which, when executed by a computer, implement the method as defined above.

BRIEF DESCRIPTION OF THE DRAWINGS

These features and advantages of the described technology will become more apparent upon reading the description which follows, given solely by way of non-limiting example, and with reference to the appended drawings, wherein.

DETAILED DESCRIPTION OF CERTAIN INVENTIVE EMBODIMENTS

FIGS. 2 to 5 represent various embodiments of an electronic device 10 according to the described technology, and configured to implement at least one critical function, comprising a plurality of programmable electronic computers 11. These computers 11 are generally hosted in an aircraft as part of the avionics environment.

Figure 1:
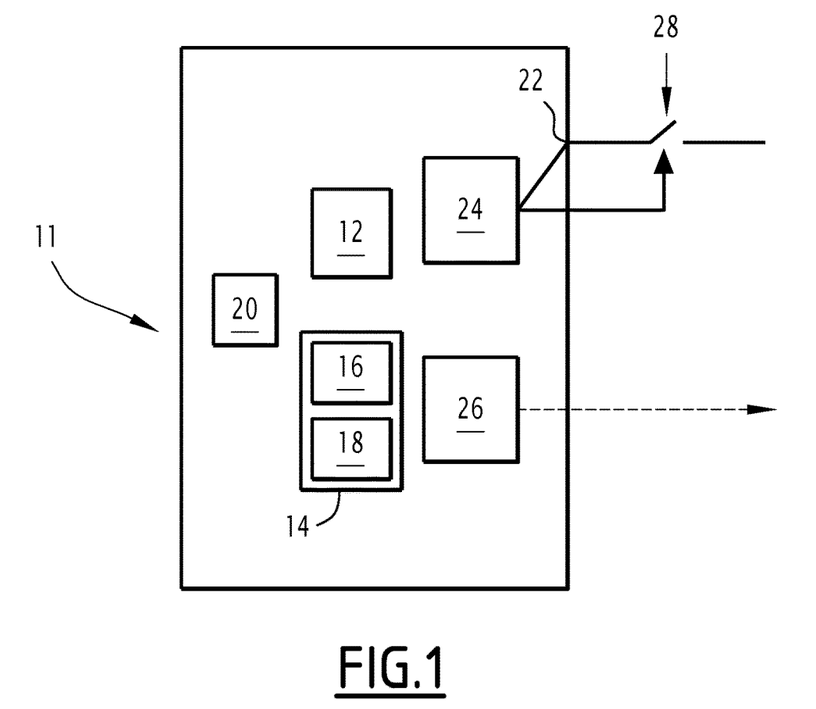
FIG. 1 shows a schematic representation of an electronic computer according to the described technology.

Each electronic computer 11, visible in FIG. 1, is able to receive at least one input data item, to implement at least one critical function from the at least one input data item, and to output at least one output data item associated with each critical function.

The electronic computer 11 is, for example, an avionics computer. The electronic computer 11 is then intended to be carried on board an air vehicle, in particular an aircraft. The critical function implemented by the electronic computer 11 is then an avionic critical function, such as a flight control function or a braking function of the aircraft. The electronic computer 11 is then preferably compliant with the DO297 standard (Integrated Modular Avionics Development Guidance and Certification Considerations).

In FIG. 1, the electronic computer 11 comprises a memory 12 that is able to store at least one software application associated with each critical function, a computer unit 14 that is able to execute each software application in order to implement each critical function, wherein the computer unit 14 comprises resources 16 and hosts a task manager 18, a power supply 20 and at least one output port 22 that is configured to output at least one output data item associated with each critical function.

The electronic computer 11 advantageously comprises its own computing unit 14 and its own power supply 20. The electronic computer 11 is, for example, in the form of an electronic module that is independent of other electronic modules and is configured to be installed in a rack (not shown), or in the form of an electronic card that is independent of other electronic cards, and is configured to be installed in an electronic housing. Alternatively, the electronic computer 11 may have its own electronic housing, and be the only computer located inside a protective housing associated with the box.

The electronic computer 11 further comprises, according to the described technology, at least one control module 24 that is configured to implement a respective critical function, and at least one monitoring module 26 of a control module 24 of another electronic computer 11.

The term "control module of another electronic computer" is understood to mean that the control module is installed on another electronic computer.

The electronic computer 11 is preferably compliant with the ARINC 653 standard and/or with the DO297 standard allowing a temporal and spatial partitioning of the resources 16, while ensuring the independence of the software applications with respect to the control unit 14. Partitioning allows the coexistence, on the same electronic computer 11, of several different critical functions.

Thus, the electronic computer 11 comprises several separate computer partitions 27, and each module among the at least one control module 24 and the at least one monitoring module 26, is installed in a respective partition 27. In particular, the electronic computer 11 comprises a distinct partition 27 per critical function implemented.

In the example of FIG. 1, a single control module 24 and a single monitoring module 26 are shown. Nevertheless, those skilled in the art will understand that the electronic computer 11 comprises, in certain embodiments of the described technology, a plurality of control modules 24 and/or a plurality of monitoring modules 26, as will be described later.

Figure 2:
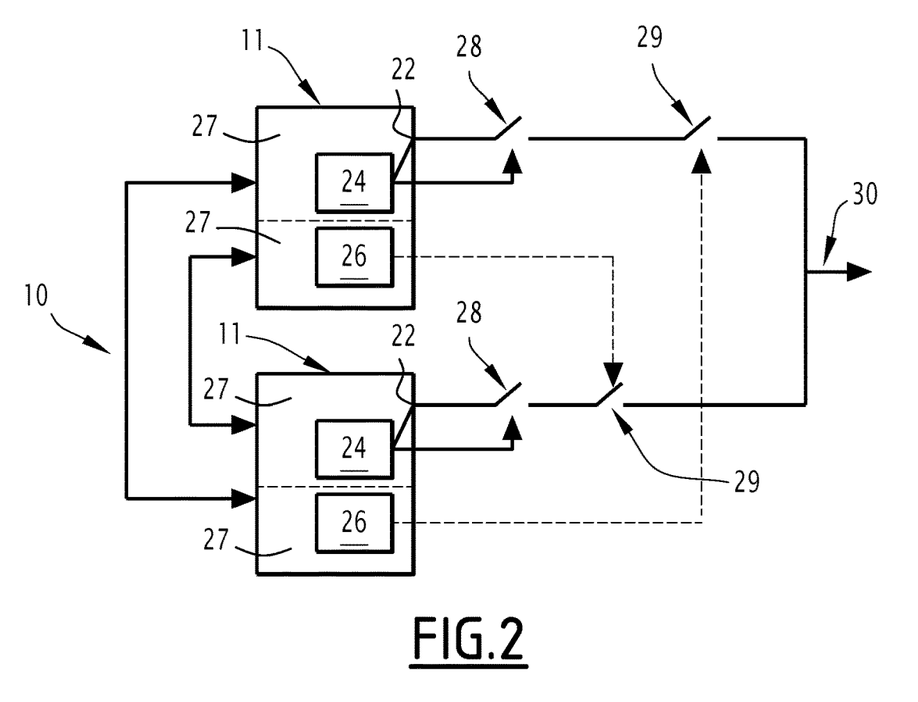
FIG. 2 shows a schematic representation of an electronic device according to a first embodiment of the described technology, the implementing a critical function, and comprising two electronic computers of FIG. 1.

In the example of FIG. 2, the monitoring module 26 of the first electronic computer 11 is configured to monitor the control module 24 of the second electronic computer 11, while the monitoring module 26 of the second electronic computer 11 is configured to monitor the control module 24 of the first electronic computer 11. The term "first electronic computer" is understood to mean that represented at the top of the figure, while the "second electronic computer" is understood to mean that represented in the figure under the "first electronic computer".

Each software application is intended to be executed by the computer unit 14 in order to implement an associated critical function and to provide at least one output data item associated with the critical function. Each software application is then configured to use resources 16 of the computer unit 14.

The resources 16 of the computer unit 14 are physical or logical elements that may be made available to the software application(s).

The resources 16 are, for example, processing-type resources, input and output resources, resources specific to the avionics network, for example, the communication routers of an ARINC 664 network, graphic type resources, mass memory type resources, or logical output.

The task manager 18 is preferably a real-time monitor for sequencing the different applications, ensuring proper segregation to meet the safety objectives through the implementation of computer partitions 27.

Alternatively, the task manager 18 may be an operating system. Each software application is then configured to issue one or more calls to the operating system 18 hosted by the computer unit 14. The operating system 18 may be, for example, an operating system compliant with the ARINC 653 standard, or a POSIX operating system, or a hypervisor, or middleware. Those skilled in the art will understand that the operating system 18 is broadly defined, and is, more generally, a set of at least one basic software that is configured to offer services of different types to each application. A service is therefore a function of the basic software that may be used by the software application(s) and may be reached by a call, also referred to as a call to a service (of the OS), or else a system call. An example of basic software is an ARINC 653 or POSIX OS that provides such services.

The power supply 20 is able to receive electrical power and to supply the electronic computer 11 and its various components with the electric current.

The control module 24 is configured to receive at least one input data item, to implement a respective critical function from the at least one input data item, and be able to deliver at least one output data item corresponding to the critical function.

In particular, the control module 24 is configured to communicate with the computer unit 14. The control module 24 is able to send an execution command to the computer unit 14 so that the computer unit 14 executes the software application associated with the critical function associated with the control module 24. The control module 24 is configured to receive the at least one output data item associated with the critical function. The control module 24 is able to deliver the at least one output data item via the output port 22.

The control module 24 is monitored by a monitoring module 26 of another electronic computer 11, and is then configured to send to the associated monitoring module 26 the result of the implementation of the critical function.

The control module 24 is configured to inhibit the delivery of the at least one associated output data item in the event of detection of an inconsistency between the result of its implementation of the respective critical function and that received from the module. Another inconsistency is detected by comparison between the two results and, for example, by detecting a difference in value greater than a predetermined threshold. The inhibition of the output data item by the control module 24 is illustrated in FIGS. 2 to 5 by a solid arrow pointing to a switch 28. In fact, each electronic computer 11 is likely to encounter material failures due to at least one malfunction of a hardware component of the electronic computer 11 and/or encountering software anomalies due to errors in a software application and the corresponding critical function must be inhibited. In the absence of hardware and software anomalies, the electronic computer 11 is able to implement the at least one critical function satisfactorily and is in a so-called functional state.

The monitoring module 26 is configured to receive at least one input data item and to implement the same critical function as that implemented by the monitored control module 24. The monitoring module 26 is configured to send to the associated control module 24 the result of the implementation of the critical function.

The control module 24 is further configured to receive, from the associated monitoring module 26, the result of implementation of the corresponding critical function.

If the electronic computer 11 comprising the control module 24 and the other electronic computer 11 comprising the monitoring module 26 are each in a functional state, each module 24, 26 is able to implement the associated critical function satisfactorily and no inconsistency between the results of the implementations of the critical function is detected by the control module 24.

In the event of a hardware failure of the electronic computer 11, the modules 24, 26 comprised in the electronic computer 11, are not able to implement the critical function in a satisfactory manner, and the electronic computer 11 is in a state referred to as dysfunctional, it is likely to be detected by the monitoring module 26 of the other electronic computer 11 which is associated with the control module 24 of the electronic computer 11. If the electronic computer 11 comprising the control module 24 is in a functional state and the other electronic computer 11 comprising the monitoring module 26 is in a dysfunctional state, the monitoring module 26 is not able to implement the critical function in a satisfactory manner and the control module 24 is then able to detect an inconsistency by comparison between the results of implementations of the critical function.

In the event of a software failure, the electronic computer 11 is not able to implement the critical function associated with the faulty software application satisfactorily. However, the electronic computer 11 is able to implement any other critical functions associated with non-faulty software applications. The electronic computer 11 is then in a degraded state. If the electronic computer 11 comprising the control module 24 is in a functional state and the other electronic computer 11 comprising the monitoring module 26 is in a degraded state, and if the respective critical function of the modules 24, 26 is associated with the faulty software application, the monitoring module 26 is not able to implement the critical function satisfactorily and the control module 24 is then able to detect an inconsistency by comparing the results of the implementations of the critical function.

The monitoring module 26 is configured to receive from the associated control module 24, the result of implementation of the corresponding critical function. The monitoring module 26 is configured to inhibit the delivery by the control module 24 of the other electronic computer 11 of the at least one associated output data item in the event of detection of an inconsistency between the result of its implementation of the respective critical function and that received from the control module 24 of the other electronic computer 11. The inhibition of the output data item by the monitoring module 26 is illustrated in FIGS. 2 to 5 by a dotted line arrow pointing to another switch 29. The inconsistency detected by the monitoring module 26 may be due to a hardware failure and/or a software error.

An output data item delivered by an output port 22 is therefore configured to be inhibited by the respective control module 24 and/or by the monitoring module 26 associated with the control module 24.

The implementation of such a system is therefore simple, since it is not necessary to locate the origin of the hardware failure or software error unlike prior systems based on a vote between several units.

In addition, the pair consists of a control module 24 and a monitoring module 26 associated with the ability to detect at least one anomaly on one of the electronic computers 11, and is therefore FAIL SAFE.

In FIG. 2, the electronic device 10 according to a first embodiment is configured to implement a given critical function comprising two electronic computers 11 as described above, and an output terminal 30, wherein the output terminal 30 is capable of supplying the at least one output data item associated with the critical function outside the electronic device 10.

Each electronic computer 11 further comprises two separate computer partitions 27, wherein each module 24, 26 is installed on a respective computer partition 27.

According to this first embodiment, the monitoring module 26 of the first electronic computer 11 is configured to monitor the control module 24 of the second electronic computer 11, while the monitoring module 26 of the second electronic computer 11 is configured to monitor the control module 24 of the first electronic computer 11. Each control module 24 is configured to communicate with the monitoring module 26 associated the result of the implementation of the critical function in order to detect a possible inconsistency and to inhibit the delivery of at least one associated output data item.

The electronic device 10 according to the first embodiment, represented in FIG. 2, is able to detect a hardware failure on one of the two electronic computers 11, to inhibit the delivery of the output data delivered by the faulty electronic computer 11, and to deliver the output data item of the other electronic computer 11. In addition, the electronic device 10 is able to detect a software error on a module 24, 26 and to inhibit the delivery of the output data item associated with the module pair 24, 26 comprising the defective module 24, 26. The electronic device 10 is then still able to deliver the output data and, in addition, to detect a hardware failure or an additional software error on the pair of operational modules 24, 26. The electronic device 10 according to the first embodiment, shown in FIG. 2, is then FAIL OPERATIONAL with respect to the software errors.

Therefore, whereas a prior art COM/MON system requires two pairs of electronic computers, the electronic device 10 according to the first embodiment comprises only two electronic computers 11 to implement the critical function with the same level of safety. The electronic device 10 according to the described technology then makes it possible to reduce the number of electronic computers 11 resulting in smaller size and mass.

Figure 3:
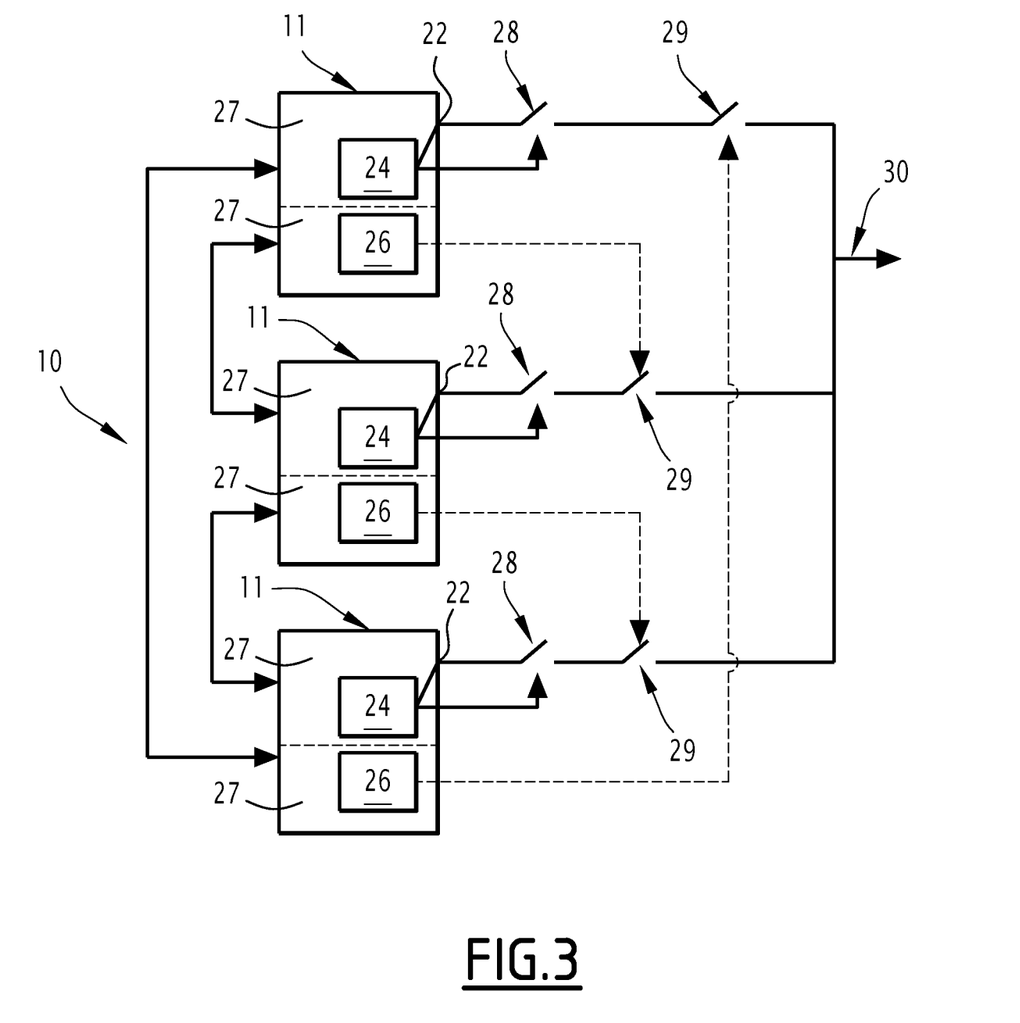
FIG. 3 shows a schematic representation of an electronic device according to a second embodiment of the described technology, implementing a critical function and comprising three electronic computers of FIG. 1.

In FIG. 3, the electronic device 10 according to a second embodiment, is configured to implement a given critical function, and comprises three electronic computers 11 as described above.

Each electronic computer 11 further comprises two separate computer partitions 27, wherein each module 24, 26 is installed on a respective computer partition 27.

The monitoring module 26 of the first electronic computer 11 is configured to monitor the control module 24 of the second electronic computer 11, wherein the monitoring module 26 of the second electronic computer 11 is configured to monitor the control module 24 of the third electronic computer 11, while the monitoring module 26 of the third electronic computer 11 is configured to monitor the control module 24 of the first electronic computer 11.

Each control module 24 is configured to communicate, with the associated monitoring module 26, the result of the implementation of the critical function in order to detect a possible inconsistency and to inhibit the delivery of the at least one associated output data item.

The electronic device 10 according to the second embodiment, shown in FIG. 3, is able to detect a hardware failure or a software error of more than the electronic device 10 according to the first embodiment, represented in FIG. 2. whereas a COM/MON system of the prior art requires two pairs of electronic computers to implement a critical function and detect a hardware failure or a software error, wherein the electronic device 10 according to the second embodiment, comprises only three electronic computers 11 to implement the critical function and detect a hardware failure or two software errors. The electronic device 10 according to the second embodiment thus makes it possible to reduce the number of necessary computers, while allowing detection of another software error.

Figure 4:
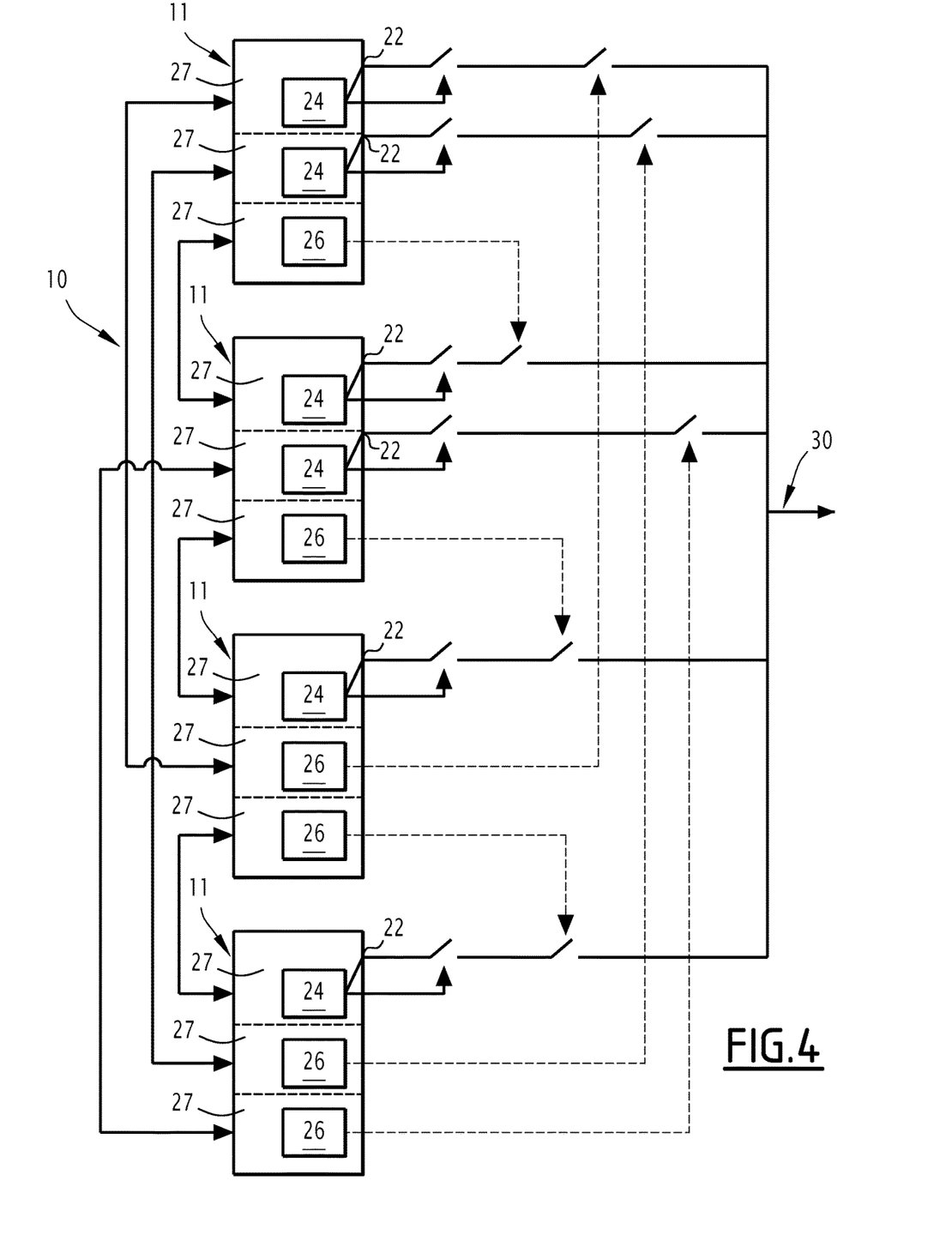
FIG. 4 shows a schematic representation of an electronic device according to a third embodiment of the described technology, implementing a critical function and comprising four electronic computers of FIG. 1.

In FIG. 4, the electronic device 10 according to a third embodiment and that is configured to implement a given critical function, comprises four electronic computers 11 as described above.

Each electronic computer 11 further comprises three separate computer partitions 27, wherein each module 24, 26 is installed on a respective computer partition 27.

Each electronic computer 11 comprises three modules 24, 26. In particular, the first two electronic computers 11 comprise two control modules 24 and a monitoring module 26, while the last two electronic computers 11 comprise a control module 24 and two monitoring modules. 26.

As may be seen in FIG. 4, the monitoring module 26 of the first electronic computer 11 is configured to monitor the first control module 24 of the second electronic computer 11; while the monitoring module 26 of the second electronic computer 11 is configured to monitor the control module 24 of the third electronic computer 11; while the first monitoring module 26 of the third electronic computer 11 is configured to monitor the first control module 24 of the first electronic computer 11.

The second monitoring module 26 of the third electronic computer 11 is configured to monitor the control module 24 of the fourth electronic computer 11; while the first monitoring module 26 of the fourth electronic computer 11 is configured to monitor the second control module 24 of the first electronic computer 11; while the second monitoring module 26 of the fourth electronic computer 11 is configured to monitor the second control module 24 of the second electronic computer 11.

The electronic device 10 according to the third embodiment, represented in FIG. 4, is able to detect a hardware failure or a software error of more than the electronic device 10 according to the second embodiment, shown in FIG. 3.

Figure 5:
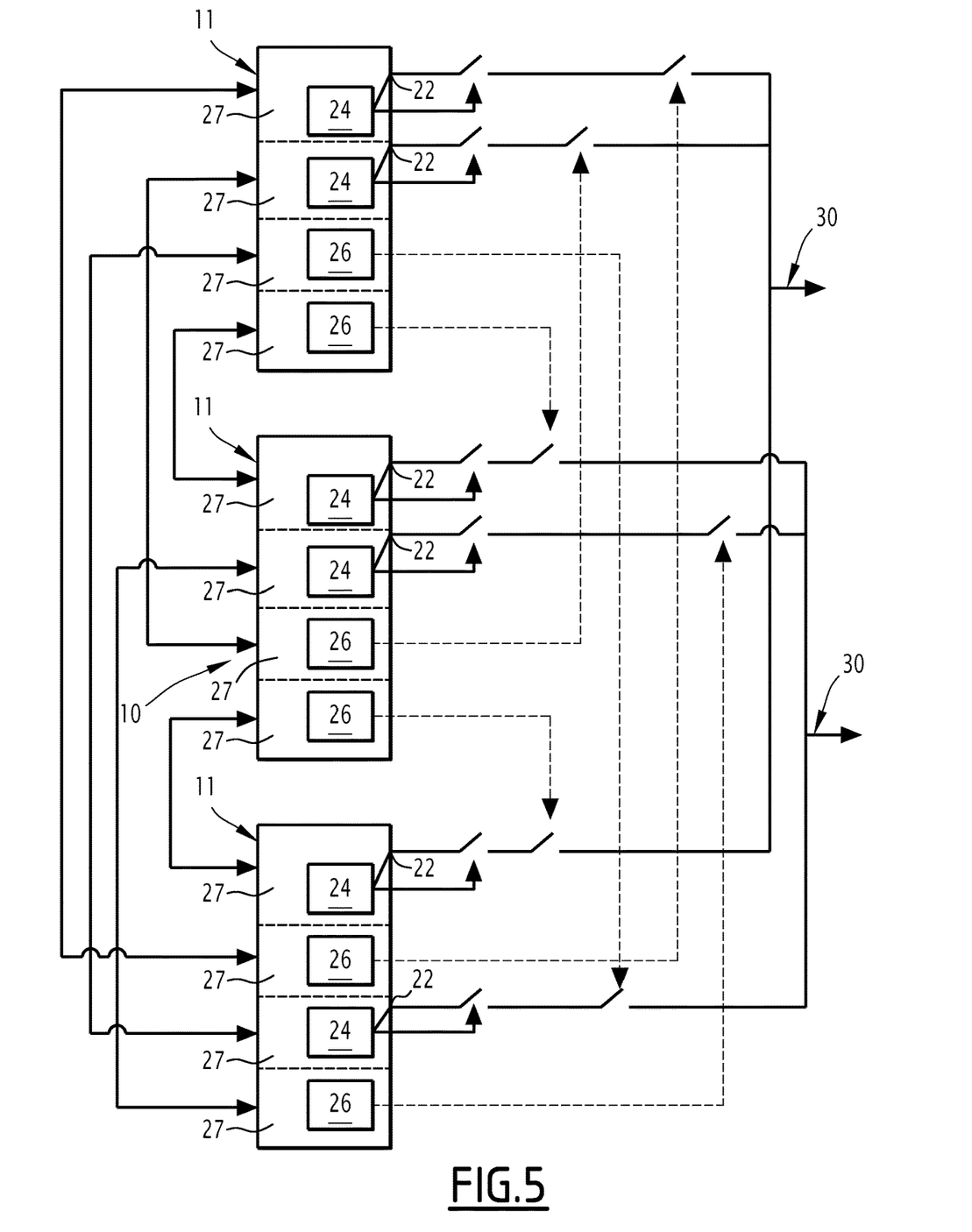
FIG. 5 shows a schematic representation of an electronic device according to a fourth embodiment of the described technology, implementing two critical functions and comprising three electronic computers of FIG. 1.

In FIG. 5, the electronic device 10 according to a fourth embodiment is configured to implement two critical functions, namely a first critical function and a second critical function. It comprises three electronic computers 11 as described above, and two output terminals 30, wherein each output terminal 30 is able to provide the at least one output data item associated with one of the two critical functions outside the electronic device 10.

Each electronic computer 11 comprises two control modules 24 and two monitoring modules 26.

In the example of FIG. 5, each electronic computer 11 further comprises four separate computer partitions 27, wherein each module 24, 26 is installed on a respective computer partition 27.

The two control modules 24 of the first electronic computer 11 are able to implement the first critical function. The two control modules 24 of the second electronic computer 11 are able to implement the second critical function. Each control module 24 of the third electronic computer 11 is able to implement a different critical function among the first and the second critical functions.

As may be seen in FIG. 5, the first monitoring module 26 of the first electronic computer 11 is configured to monitor the second control module 24 of the third electronic computer 11; while the second monitoring module 26 of the first electronic computer 11 is configured to monitor the first control module 24 of the second electronic computer 11; and the first monitoring module 26 of the second electronic computer 11 is configured to monitor the second control module 24 of the first electronic computer 11.

The second monitoring module 26 of the second electronic computer 11 is configured to monitor the first control module 24 of the third electronic computer 11; while the first monitoring module 26 of the third electronic computer 11 is configured to monitor the first control module 24 of the first electronic computer 11; and the second monitoring module 26 of the third electronic computer 11 is configured to monitor the second control module 24 of the second electronic computer 11.

In view of the various examples described above, those skilled in the art will understand that the described technology is generalizable to an electronic device 10 comprising N electronic computers 11, wherein N is an integer that is greater than or equal to 2.

Preferably, when the number N of electronic computers 11 is even, and for a given critical function, (N/2) electronic computers 11 each comprise (N/2−1) control modules 24 and (N/2) monitoring modules 26, (N/2) other electronic computers 11 each comprise (N/2) control modules 24 and (N/2−1) monitoring modules 26.

Preferably, when the number N of electronic computers 11 is odd, for a given critical function, each electronic computer 11 comprises ((N−1)/2) control modules 24 and ((N−1)/2) monitoring modules 26.

The electronic device 10 is then able to implement at least one critical function with the desired level of safety and redundancy with a reduced number of electronic computers 11.

According to a preferred embodiment of the described technology, for each electronic computer 11, the set of electronic computers 11 comprising a control module 24 monitored by a monitoring module 26 of the electronic computer 11 and the set of electronic computers 11 comprising a monitoring module 26 monitoring a control module 24 of the electronic computer 11 are separate.

For example, in the electronic device 10 according to the third embodiment, shown in FIG. 4, the control modules 24 of the first electronic computer 11 are monitored by the monitoring modules 26 of the third and fourth electronic computers 11, while the module 26 of the first electronic computer 11 monitors the control module 24 of the second electronic computer 11.

This architecture of the electronic device 10 provides better redundancy and ensures better operational availability. In fact, each electronic computer 11 thus depends on several other electronic computers 11, and is therefore less affected in the event of an anomaly on an electronic computer 11.

According to a complementary aspect of the described technology, each electronic computer 11 is physically dissimilar to another electronic computer 11, and is made in a different form from a material point of view, such as, for example, a Field Programmable Gate Array (FPGA), or an Application Specific Integrated Circuit (ASIC) for the other electronic computer 11. Thus, if a generic failure appears on a certain type of structure, not all the electronic computers 11 become defective at the same time, and the integrity of the electronic device 10 is preserved. With this material dissimilarity as an optional complement, the implementation of the critical function is even safer.

Optionally or additionally to the aforementioned complementary aspect, each module among the modules 24, 26 associated with a critical function is, from a software point of view, dissimilar to another module 24, 26 and is made in a different form from a software point of view, for example by using a different programming language. Thus, if a software error appears on a certain type of software, all the modules 24, 26 associated with the same critical function do not become defective at the same time. With this optional software dissimilarity, the implementation of the critical function is even safer.

According to another complementary aspect of the described technology, the role of each module 24, 26 of an electronic computer 11 is configured to be modified during operation of the electronic computer 11. For example, a control module 24 is able to become a monitoring module 26, or a control module 24 implementing a first critical function is able to become a control module 24 implementing a second critical function that is different from the first critical function. In other words, each electronic computer 11 is dynamically reconfigurable. Thus, in the event of a hardware failure or a software error affecting one or more electronic computers 11, the electronic device 10 is configured to be reconfigured dynamically in order to implement the critical functions with the desired level of safety.

Figure 6:
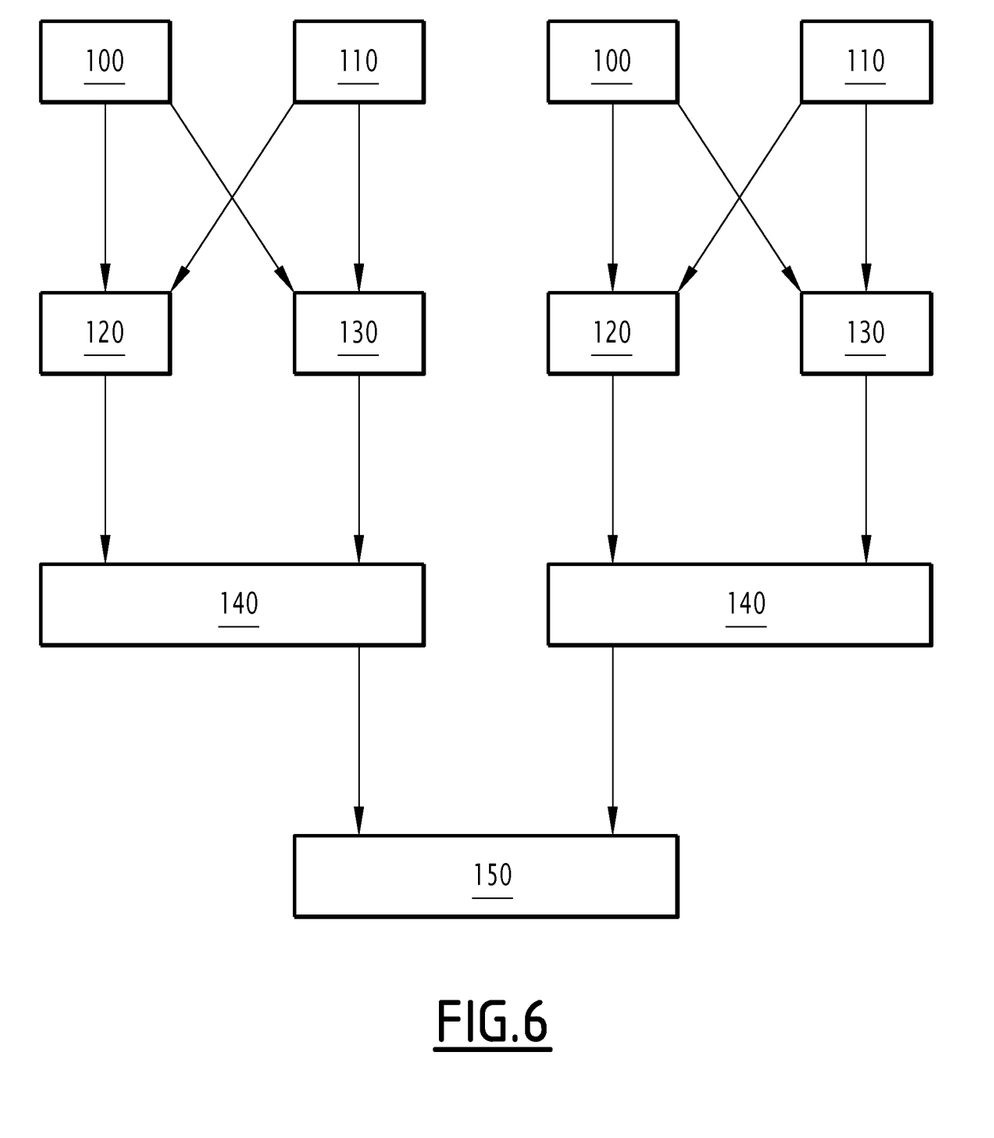
FIG. 6 shows a flowchart of a method, according to the described technology, for implementing a critical function.

The operation of the electronic computer 11 according to the described technology will now be explained with the aid of FIG. 6 showing a flowchart of the method according to the described technology, of implementing a critical function, wherein the method is implemented by the electronic computer 11 within the electronic device 10.

The method described above is implemented in the form of one or more software programs, i.e. in the form of a computer program, it is also capable of being recorded on a medium (not shown) that may be read by a computer. The computer-readable medium is, for example, a medium that is suitable for storing electronic instructions and capable of being coupled to a bus of a computer system. For example, the readable medium may be a diskette or floppy disk, an optical disk, a CD-ROM, a magneto-optical disk, a ROM memory, a RAM memory, any type of non-volatile memory (e.g. EPROM, EEPROM, FLASH, NVRAM) a magnetic card or an optical card. A computer program including software instructions is then stored on the readable medium.

For the sake of simplification of the description, the method will be described for the electronic device 10 according to the first embodiment, comprising two electronic computers 11 and implementing a given critical function, as shown in FIG. 2.

Those skilled in the art will understand that this method is applicable to any type of electronic device 10 according to the described technology, and is, in particular, similar for the second, third, fourth embodiments to that of the first embodiment described below.

During a step 100, a first implementation of the critical function is performed by each control module 24. Then, the control module 24 communicates the output data item associated with the critical function to the associated monitoring module 26 and delivers the output data through the output port 22.

In a step 110, a second implementation of the critical function is performed by each monitoring module 26. Next, the monitoring module 26 communicates the output data associated with the critical function to the associated control module 24.

The terms "first implementation" and "second implementation" are used as simple terminology but do not imply any temporal relationship between the method steps. The first implementation may be performed before, at the same time, or after the second implementation.

In a step 120, each control module 24 receives from the associated monitoring module 26 the result of implementation of the critical function corresponding to the second implementation. In the event of detection of an inconsistency between the result of the first implementation of the respective critical function and that received from the associated monitoring module 26, it then inhibits the delivery of the associated output data item, represented by the switch 28.

In a step 130, each monitoring module 26 receives from the associated control module 24 the result of implementation of the critical function corresponding to the first implementation. In the event of detection of an inconsistency between the result of the second implementation of the respective critical function and that received from the associated control module 24, it inhibits the delivery of the associated output data item, represented by the switch 29.

The output data associated with the critical function is only delivered by each control module 24 during a step 140, if no inconsistency has been detected by the control module 24 and by the monitoring module 26.

During an optional step 150, each pair of modules 24, 26 sends to the other pair of modules 24, 26, information indicating whether the electronic computers 11 on which the modules 24, 26 are installed, are in a functional, degraded or dysfunctional state. In addition, each pair of modules 24, 26 sends to the other pair of modules 24, 26 information indicating whether the delivery of the associated output data item is inhibited or not.

Those skilled in the art will understand that step 150 is a step that is advantageously implemented in the event of a software failure, but that it is not necessary in order to obtain an electronic computer offering better operational availability, while offering an overall reduced size and mass.

As an optional supplement, among the pairs of modules 24, 26 installed on electronic computers 11 in a functional or degraded state, but whose associated software application is not defective, and on electronic computers 11 which have not inhibited the delivery of the output data, an index may be assigned to each pair of modules 24, 26.

Only the output data item output from the pair of modules 24, 26 having the lower index is provided as the final output data item outside the electronic device 10 through the output terminal 30. The pair of modules 24, 26 having the lowest index is said to be engaged.

The index of each pair of modules 24, 26 changes regularly in order to avoid undetected or so-called dormant failures, and then forms a token.

The method according to the described technology therefore does not implement a voting algorithm between the different pairs of modules 24, 26, unlike some methods of the prior art.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A programmable electronic computer embedded in avionics on board an aircraft, the electronic computer configured to implement at least one critical function, wherein the electronic computer is configured to deliver at least one output data item associated with each critical function, and wherein the electronic computer comprises:

at least one control module, wherein each control module is configured to implement a respective critical function and is configured to deliver at least one output data item associated with the critical function; and at least one monitoring module of a control module of another electronic computer, wherein each monitoring module is configured to implement the same respective critical function as the one implemented by the monitored control module;

wherein each control module is configured to receive, from an associated monitoring module of another electronic computer, a result of implementing the corresponding critical function, and is configured to inhibit the delivery of the at least one associated output data item in the event of detection of an inconsistency between a result of its implementation of the respective critical function and that received from the monitoring module of the other electronic computer, wherein each monitoring module is configured to receive, from an associated control module of another electronic computer, a result of implementing the corresponding critical function, and is configured to inhibit the delivery, by the control module, of the at least one associated output data item in the event of detection of an inconsistency between the result of its implementation of the respective critical function and that received from the control module of the other electronic computer.

2. The electronic computer according to claim 1, wherein the electronic computer comprises several separate computer partitions, and each module among the at least one control module and the at least one monitoring module is installed in a respective partition.

3. The electronic computer according to claim 1, wherein the electronic computer comprises its own power supply and its own computer unit.

4. The electronic computer according to claim 1, wherein the critical function is an avionics function.

5. An electronic device comprising N electronic computers, wherein N is an integer greater than or equal to 2, and wherein each electronic computer is according to claim 1.

6. The electronic device according to claim 5, wherein for each electronic computer, the set of electronic computers comprising a control module monitored by a monitoring module of the electronic computer and all electronic computers comprising a monitoring module monitoring a control module of the electronic computer are separate.

7. The electronic device according to claim 5, wherein the number N of electronic computers is even, and for a given critical function, (N/2) electronic computers comprise (N/2−1) control modules and (N/2) monitoring modules, while (N/2) other electronic computers comprise (N/2) control modules (24) and (N/2−1) monitoring modules.

8. The electronic device according to claim 5, wherein the number N of electronic computers is odd, and for a given critical function, each electronic computer comprises ((N−1)/2) control modules and ((N−1)/2) monitoring modules.

9. A method for implementing at least one critical function, wherein the method is implemented by a programmable electronic computer embedded in avionics on board an aircraft and comprises:

a first implementation of at least one critical function and delivery of at least one output data item associated with the critical function;

a second implementation of at least one critical function identical to that implemented by another electronic computer;

a first reception, from another electronic computer, of a result of implementation of the critical function corresponding to the first implementation, and inhibition of the delivery of the at least one associated output data item, when an inconsistency is detected between a result of the first implementation of the respective critical function and that received from the other electronic computer; and a second reception, from another electronic computer, of a result of implementation of the critical function corresponding to the second implementation, and inhibition of the delivery, by the other electronic computer of the at least one associated output data item when an inconsistency is detected between the result of the second implementation of the respective critical function and that received from the other electronic computer.

10. A non-transitory computer-readable medium including a computer program comprising software instructions which, when executed by a computer, implement the method according to claim 9.

* * * * *